United States Patent [19]

Daitoku

[11] 4,172,648
[45] Oct. 30, 1979

[54] MIRROR MECHANISM IN SINGLE-LENS REFLEX CAMERA

[75] Inventor: Koichi Daitoku, Tokyo, Japan
[73] Assignee: Nippon Kogaku K.K., Tokyo, Japan
[21] Appl. No.: 902,799
[22] Filed: May 4, 1978
[30] Foreign Application Priority Data May 7, 1977 [JP] Japan .............................. 52/57818[U]

[51] Int. Cl.² ............................................ G03B 19/12
[52] U.S. Cl. .................................................... 354/156
[58] Field of Search ................................ 354/150–156

[56] References Cited

U.S. PATENT DOCUMENTS

| 3,221,626 | 12/1965 | Fuketa | 354/153 |
| 3,646,868 | 3/1972 | Sekida | 354/156 |
| 3,731,609 | 5/1973 | Kobayashi et al. | 354/152 |

FOREIGN PATENT DOCUMENTS 38-20682 10/1963 Japan ........................................ 354/152

Primary Examiner—Donald A. Griffin
Attorney, Agent, or Firm—Shapiro and Shapiro

[57] ABSTRACT

A mirror mechanism for use in a single-lens reflex camera comprises a mirror descent mechanism having a support member rotatably supported and formed integrally with said mirror, said support member being adapted to cooperate with said mirror drive mechanism at the photograph-taking operation to displace said mirror from said image-viewing position to said photograph-taking position, a mirror pin provided on said support member and adapted to rotate integrally with said support member, a pin fixed on the camera body, and a suspended spring member which is rotatably supported at the ends thereof respectively by said mirror pin and said fixed pin, and which is charged, upon rotation of said mirror from said image-viewing position to said photograph-taking position, to develop a returning force for rotating said mirror in a direction opposite to said rotation from said photograph-taking position to said image-viewing position.

The center of said mirror pin when said mirror is in the photograph-taking position being positioned within an area defined between a line connecting the center of rotation of said support member and the center of said mirror pin when said mirror is in the image-viewing position and a line connecting said center of rotation of support member and the center of fixed pin whereby the descending torque of mirror resulting force of said spring member increases in the initial phase of rotation of mirror from the image-viewing position to the photograph-taking position and decreases in the latter phase of said rotation.

3 Claims, 3 Drawing Figures

MIRROR MECHANISM IN SINGLE-LENS REFLEX CAMERA

BACKGROUND OF THE INVENTION

1. Field of the Invention

The present invention relates to a mirror mechanism for use in a single-lens reflex camera, and more particularly to a mirror descent spring for use in said mirror mechanism.

2. Description of the Prior Art

In single-lens reflex cameras there is already known a mirror mechanism allowing a manual ascent and descent of miror in order, for example, to allow replacement of batteries for exposure meter accommodated in the mirror chamber. In such mechanism the mirror, being provided with a descent spring for allowing manual displacement thereof, ascends upon shutter release by the force of drive mechanism and against the force of said mirror descent spring, and descends by the force of said spring upon descending function of the drive mechanism.

Apart from the quick-return function performed in the above-mentioned manner, the mirror is structured to be manually liftable for example for replacement of batteries mentioned above.

In case of a conventional mirror descent spring the axis of rotation of mirror or a separate axis provided on a mirror-supporting frame is inserted into a coiled portion of a torsion spring of which one end is fixed on the camera body while the other end engages with a part of said mirror.

In such structure wherein the axis of rotation of mirror is inserted into said coiled portion of spring, the photographing light beam may be partly blocked if the coiled portion of spring is enlarged since said axis of rotation is located close to the path of said light beam. The resulting limitation on the volume of said coiled portion renderes it impossible to reduce the spring constant beyond a certain limit, giving rise to a larger energy required for the drive mechanism to elevate the mirror. Also such mechanism is associated with the following drawback.

Referring to FIG. 1, A represents the drive torque generated by the mirror drive mechanism to elevate the mirror;

B represents the mirror descent torque generated by a conventional mirror descent spring;

C represents the load of a hooking lever which generally functions to hold the first blind or forward curtain of shutter by means of a hook and which transmits the completion of mirror ascent to the shutter mechanism (not shown) to start the movement of said first blind; and D represents B+C wherein A<D in the vicinity of the photograph-taking position so that the rotating system including the mirror drive mechanism and the mirror is decelerated, being subjected to a braking torque.

The value of C represents the force for unhooking the first blind of shutter, and it is necessary to select a large safety factor to achieve secure unhooking of the first blind even under eventual fluctuation of the value C since it involves various uncertain factors such as the change in the force of spring for driving the first blind or in the frictional force of hooking or the hooking efficiency. For this reason the value A should be increased in the vicinity of the mirror ascent state. Such change in the value A without altering the same in the vicinity of the mirror descent state signifies a smaller inclination for the curve A. However, since the curve A is already designed with a slope as small as possible, such change is only possible by increasing the value A throughout the entire curve, the mirror ascent and descent states inclusive. Such will inevitably result in a higher load in the film advancing operation as the drive torque for mirror ascent is developed by charging of the mirror drive mechanism at said film advancing operation.

SUMMARY OF THE INVENTION

The object of the present invention is to provide an improved mirror mechanism for use in a single-lens reflex camera featured in:

(1) that the coiled portion of spring can be of a large diameter regardless of the mirror moving space to achieve a small spring constant; and (2) that a large safety factor can be selected for the load torque for unhooking the shutter upon completion of the mirror ascent.

DETAILED DESCRIPTION OF THE PREFERRED EMBODIMENTS

Figure 2:
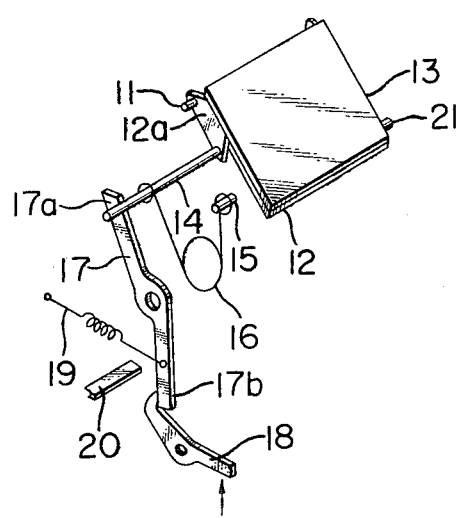
FIG. 2 is a schematic perspective view of an embodiment of the mirror mechanism of the present invention.

Now the present invention will be further clarified by an embodiment thereof. Referring to FIG. 2 schematically showing the mirror mechanism of the present invention, on a rotary axis 11 fixed on the camera body (not shown), there is rotatably supported a support member 12 on which fixed is a mirror 13. On the folded portion 12a of said support member 12 there is studded a mirror pin 14, while there is provided a pin 15 fixed on the camera body. There is provided a descent spring 16 of which one end engages rotatably with said mirror pin 14 while the other end engages rotatably with said fixed pin 15 so that the coiled portion thereof remains suspended. A rotatably provided mirror drive lever 17 is retained, upon completion of the running of the second blind or rear curtain of shutter, by a release hook 18 as shown in FIG. 2. 19 is an ascent spring of which one end engages with said mirror drive lever 17 and the other end is connected to a film advancing mechanism (not shown). 20 is a hook lever for starting the movement of the first blind upon engagement with said mirror drive lever 17. 21 is a limit pin for limiting the clockwise rotation, or descent, of the mirror support member.

The function of the above-explained mechanism will be shown in the following. FIG. 2 shows a state after the film advancement but prior to shutter release, wherein the mirror 13 reflects the light beam from a camera lens upwards in the drawing to a view-finder system, said state being referred to as the image-viewing position of the mirror 13. In such state the descent spring 16 is designed to have a minimum biasing force to retain the mirror 13 in said image-viewing position. Upon the start of shutter release, the release hook 18, being actuated in the direction of arrow, is rotated anti-clockwise to release the mirror drive lever 17, which is rotated clockwise by the biasing force of the ascent spring 19 to cause an anticlockwise rotation of the support member 12 and the mirror 13 through an engagement between a lever end 17a and the mirror pin 14 thereby retracting said members from the light path for photographing. Also immediately before the completion of mirror ascent, the other lever end 17b engages with the hook lever 20 to start the running of first blind. Such state of start of photograph-taking upon completion of mirror ascent is referred to as the photograph-taking state of mirror. Simultaneously said clockwise rotation of the mirror drive lever 17 charges the descent spring 16 to increase the descent energy of the mirror 13. Thus, an anticlockwise rotation of the mirror drive lever 17, in relation to the completion of running of second blind in the conventional manner upon the lapse of the predetermined shutter period, causes the descent of said support member 12 and the mirror 13 to the original image-viewing position by means of the returning force of said descent spring 16.

Figure 3:
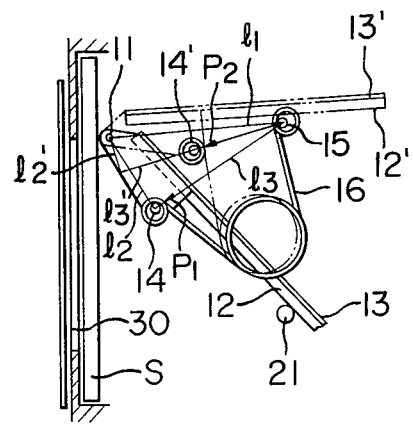
FIG. 3 is a lateral view showing said mirror mechanism in the image-viewing position and the photograph-taking position of mirror.

Now there will be given a detailed explanation on said descent spring 16, while referring to FIG. 3, wherein the image-viewing position and the photograph-taking position of mirror are respectively represented by full lines and double-dotted chain lines. FIG. 3 also shows a photographic film F, an aperture 30 and a shutter curtain S. In FIG. 3 there is formed a triangle by a line $l_1$ connecting the center of rotary axis 11 and the center of fixed pin 15, a line $l_2$ connecting said center of rotary axis 11 and the center of mirror pin 14, and a line $l_3$ connecting the center of fixed pin 15 and the center of said mirror pin 14. In the represent embodiment the lines $l_2$ and $l_3$ form a substantially right angle.

Upon shutter release, the mirror 13 and the support member 12, rotating around the axis 11, displaces from the image-viewing position to the photograph-taking position. In this displacement, since the axis 11 and the fixed pin 15 are fixed to the camera body and not related to the movement of the mirror 13, the mirror pin 14 alone rotates upward around the axis 11 together with the rotation of said mirror to cause a deformation in the triangle formed by said lines $l_1$, $l_2$ and $l_3$.

Simultaneously the descent spring 16 is charged but is incapable of causing the descent of mirror 13 against the drive torque of the ascent spring 19 during the course of displacement of mirror 13 from the image-viewing position to the photograph-taking position.

Figure 1:
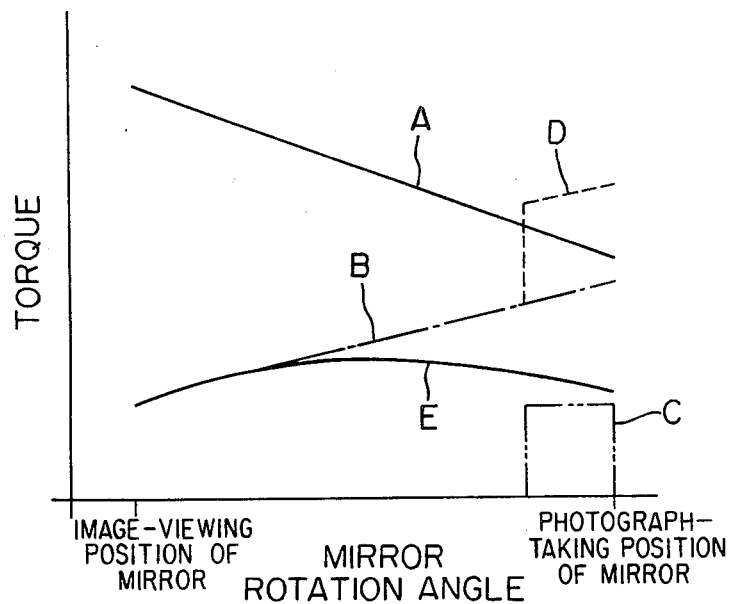
FIG. 1 is a graph showing the changes, from the image-viewing position of mirror to the photograph-taking position thereof, in the ascent drive torque by the mirror drive mechanism, in the descent torques of a conventional mirror descent spring and a mirror descent spring of the present invention, and in the load of hooking lever for starting the movement of the first blind.

Now explained in the following is the change in the descent torque of descent spring 16 during the course of displacement of mirror from the image-viewing position to the photograph-taking position. In the image-viewing position there is obtained a descent torque as a product of the returning force $P_1$ of the descent spring 16 and the line $l_2$, but the descent of mirror 13 is limited to the limit pin 21. Along with the ascent of mirror the descent spring 16 becomes charged to achieve a maximum returning force $P_2$ at the photograph-taking position thereof. The descent torque for the mirror 13 is a product of the length of a perpendicular $l_2'$ drawn from the center of axis 11 to a line $l_3'$ connecting the center of pin 14' and the center of pin 15 and the returning force $P_2$. As shown at E in FIG. 1, the descent torque reaches a maximum during the course of mirror ascent and gradually decreases thereafter. Thus, in comparison with the conventional descent torque reaching a maximum at the photograph-taking position as represented by the curve B, the descent torque according to the present invention is lower in the photograph-taking position. If said lines $l_1$, $l_2$ and $l_3$ form a right angle triangle as in the present embodiment, the returning force $P_1$ of the descent spring at the image-viewing position functions solely as a component of the descent torque to avoid unnecessary friction on the axis 11, thus reducing the loss of drive torque of the ascent spring 19 at the mirror ascent. The descent torque behavior as represented by the curve E in FIG. 1 can be obtained if the displacement of pin 14 at the movement of mirror from the image-viewing position to the photograph-taking position is confined within an acute angle formed by the lines $l_1$ and $l_2$, since a descent torque is not developed if the pin 14 is located outside said acute angle at the photograph-taking position. Although an unnecessary friction is unavoidable between said axis 11 and the support member 12 if said lines $l_1$, $l_2$ and $l_3$ do not form a right angle triangle, it is still possible to achieve a higher value for the aforementioned safety factor.

The mechanism thus far explained results in the following effects.

Since the descent torque developed by the descent spring 16 at the photograph-taking position of mirror can be rendered smaller than in the conventional mechanism, it becomes possible to select a higher safety factor for the load torque for unhooking the shutter upon the mirror ascent. In this manner a higher safety factor can be achieved without increasing the drive torque of the mirror drive mechanism, or without increasing the load required for the film advancement. Furthermore, since the descent spring is provided parallel to the side of the mirror and the coiled position of said spring is suspended by the mirror pin and the fixed pin, it is rendered possible to select a larger coil diameter for the descent spring, with an accordingly reduced spring constant.

What I claim is:

1. A mirror mechanism for use in a single-lens reflex camera and adapted, at the photograph-taking operation, for rotating a mirror to elevate said mirror from an image-viewing position to a photograph-taking position by means of a mirror drive mechanism and, upon completion of photograph-taking, performing a quick-return function to rotate said mirror thereby lowering said mirror from said photograph-taking position to said image-viewing position by means of a mirror descent mechanism, and further capable of displacing said mirror regardless of said mechanisms, comprising the mirror descent mechanism which comprises:

(a) a support member rotatably supported and formed integrally with said mirror, said support member being adapted to cooperate with said mirror drive mechanism at the photograph-taking operation to displace said mirror from said image-viewing position to said photograph-taking position;

(b) a mirror pin provided on said support member and adapted to rotate integrally with said support member;

(c) a pin fixed on the camera body; and (d) a suspended spring member which is rotatably supported at the ends thereof respectively by said mirror pin and said fixed pin, and which is charged, upon rotation of said mirror from said image-viewing position to said photograph-taking position, to develope a returning force for rotating said mirror in a direction opposite to said rotation from said photograph-taking position to said image-viewing position;

the center of said mirror pin when said mirror is in the photograph-taking position being positioned within an area defined between a line connecting the center of rotation of said support member and the center of said mirror pin when said mirror is in the image-viewing position and a line connecting said center of rotation of support member and the center of fixed pin whereby the descending torque of mirror resulting from the returning force of said spring member increases in the initial phase of rotation of mirror from the image-viewing position to the photograph-taking position and decreases in the latter phase of said rotation.

2. A mirror mechanism according to the claim 1, wherein a triangle formed, at the image-viewing state, by a line connecting the center of rotation of said support member and the center of mirror pin, a line connecting said center of rotation of support member and the center of fixed pin and a line connecting the center of fixed pin and the center of mirror pin is a right angle triangle, and the mirror pin at the photograph-taking position is located within said rectangular triangle.

3. A mirror mechanism according to the claim 1 or 2, wherein said spring member is biased when the mirror is in the image-viewing position so as to retain said mirror in said position.

* * * * *